US008530052B2

(12) United States Patent
Guo et al.

(10) Patent No.: US 8,530,052 B2
(45) Date of Patent: Sep. 10, 2013

(54) CARBON NANOTUBE COMPOSITE PREFORM AND METHOD FOR MAKING THE SAME

(75) Inventors: Hai-Zhou Guo, Beijing (CN); Feng-Wei Dai, Beijing (CN); Yuan Yao, Beijing (CN); Chang-Shen Chang, Tu-Cheng (TW); Chang-Hong Liu, Beijing (CN); Kai-Li Jiang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1222 days.

(21) Appl. No.: 12/002,116

(22) Filed: Dec. 14, 2007

(65) Prior Publication Data

US 2009/0061208 A1 Mar. 5, 2009

(30) Foreign Application Priority Data

Aug. 31, 2007 (CN) .......................... 2007 1 0076745

(51) Int. Cl.
*B32B 9/00* (2006.01)
(52) U.S. Cl.
USPC ............ 428/408; 423/448; 977/742; 165/185
(58) Field of Classification Search
USPC ............... 428/408; 423/447.1, 447.2, 447.3; 165/185; 977/742
See application file for complete search history.

(56) References Cited

U.S. PATENT DOCUMENTS

| 6,407,922 B1 * | 6/2002 | Eckblad et al. ............... 361/704 |
| 6,856,016 B2 * | 2/2005 | Searls et al. .................. 257/720 |
| 2003/0122111 A1 * | 7/2003 | Glatkowski .................... 252/500 |

FOREIGN PATENT DOCUMENTS

| TW | 200404737 | 4/2004 |
| TW | 200610202 | 3/2006 |
| TW | 200636056 | 10/2006 |

* cited by examiner

*Primary Examiner* — Maria Veronica Ewald
*Assistant Examiner* — Daniel H Miller
(74) *Attorney, Agent, or Firm* — Altis Law Group, Inc.

(57) ABSTRACT

A carbon nanotube composite preform includes a substrate and a plurality of carbon nanotubes formed thereon. Each carbon nanotube includes a first end adjacent to the substrate and a second end away from the substrate. Gaps between the second ends of the carbon nanotubes are bigger than gaps between the first ends thereof. The method for making the carbon nanotube composite preform includes the following steps: (a) providing a substrate; (b) forming a plurality of carbon nanotubes (e.g., a carbon nanotube array) on the substrate; (c) placing the carbon nanotubes and the substrate in a solvent for some time; (d) removing the carbon nanotubes and the substrate from the solvent; (e) drying the carbon nanotubes and the substrate to form a carbon nanotube composite preform.

12 Claims, 9 Drawing Sheets

CARBON NANOTUBE COMPOSITE PREFORM AND METHOD FOR MAKING THE SAME

BACKGROUND

1. Field of the Invention

The invention relates to a preform and method for making the same, particularly, to a carbon nanotube composite preform and a method for making the same.

2. Discussion of Related Art

Carbon nanotubes (CNT) are a novel carbonaceous material and received a great deal of interest since the early 1990s. Carbon nanotubes have interesting and potentially useful electrical and mechanical properties. Due to these and other properties, it becomes an important application direction for CNTs to be used as fillers in engineering materials.

Nowadays, the method for growing a CNT array on a substrate, such as a glass, silicon, or heat-resistant metal substrate has matured. CNT arrays are in widespread used, such as in field emission tubes, ultra-thin flat panel displays, cathode electrodes, biosensors and so on.

However, naturally occurring gas-filled spaces between CNTs in CNT arrays lead to poor radial properties (such as thermal conductivity) and thus affect the properties of the whole material. So it is beneficial to fill gaps between CNTs in the CNT array with metals or polymer materials to make a composite material. This ensures the composite material has improved radial properties.

Conventionally, the CNT composite material is made by directly infiltrating the melting metal or polymer material into the CNT array. Referring to an article by H. Huang entitled "Aligned Carbon Nanotube Composite Films for Thermal Management" (Adv Mater., Vol 17, 2005, p1652), the above-described manufacturing process is reported. However, the gaps between the CNTs in the CNT array are so small that some materials, such as indium, copper, etc., cannot infiltrate the CNT array well.

What is needed, therefore, is a CNT composite preform with filterable gaps between CNTs and a simple, low cost, and short cycle method for making the described CNT composite preform.

SUMMARY

In one embodiment, a CNT composite preform includes a substrate and a plurality of CNTs formed thereon. Each CNT includes a first end adjacent to the substrate and a second end away from the substrate. Gaps between the second ends of the CNTs are bigger than gaps between the first ends thereof. The method for making the CNT composite preform includes the following steps: (a) providing a substrate; (b) forming a plurality of CNTs (e.g., a CNT array) on the substrate; (c) placing the CNTs and the substrate in a solvent for some time; (d) removing the CNTs and the substrate from the solvent; (e) drying the CNTs and the substrate to form a CNT composite preform.

Other advantages and novel features of the present CNT composite preform and the related method for making the same will become more apparent from the following detailed description of present embodiments when taken in conjunction with the accompanying drawings.

BRIEF DESCRIPTION OF THE DRAWINGS

Many aspects of the present CNT composite preform and the related method for making the same can be better understood with reference to the following drawings. The components in the drawings are not necessarily to scale, the emphasis instead being placed upon clearly illustrating the principles of the present CNT composite preform and the related method for making the same.

Figure 1:
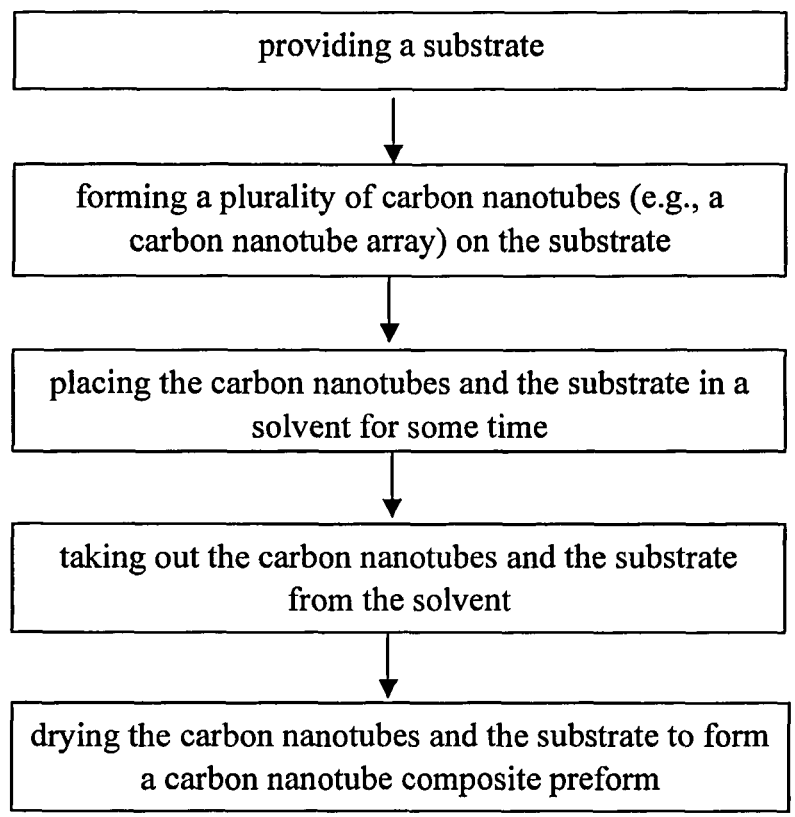
FIG. 1 is a flow chart of a method for making a CNT composite preform, in accordance with a first embodiment.

Corresponding reference characters indicate corresponding parts throughout the several views. The exemplifications set out herein illustrate at least one preferred embodiment of the present CNT composite preform and the related method for making the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the carbon nanotube (CNT) composite preform and the related method for making the same.

Referring to FIG. 1, a method for making a CNT composite preform includes the following steps: (a) providing a substrate; (b) forming a CNT array on the substrate; (c) placing the CNT array and the substrate in a solvent for some time; (d) removing the CNT array and the substrate from the solvent; (e) drying the CNT array and the substrate to form a CNT composite preform.

In step (a), the substrate is made of at least one material selected from a group consisting of glass, silicon, metal, and metal oxide. The substrate has at least one surface. In step (b), the CNTs are formed by chemical vapor deposition method or laser ablation method. A diameter of each CNT in the CNT array is in the approximate range from 1 to 100 nanometers. A length of the CNTs in the CNT array is in the approximate range from 1 to 500 micrometers. In the embodiments, the maximum height of the CNT array is about 200 micrometers. The gaps between CNTs in the CNT array are in the approximate range from 1 to 100 nanometers. The CNTs are single-walled CNT, double-walled CNT, or multi-walled CNT.

Step (c) further includes the substeps of: (c1) supplying a solvent; (c2) placing the solvent in a container; (c3) placing the CNT array and the substrate in the solvent for some time.

In step (c1), the solvent includes at least one substance selected from a group consisting of water, ethanol and oxydol solution. A mass concentration of the oxydol solution is about 25%. The amount of the solvent is, usefully, enough to immerse the CNT array therein. In step (c3), the immersion time is in an approximate range from 10 to 60 minutes.

Step (c) further includes a substep of vacuum treatment or ultrasonic vibration treatment to evacuate the gas between the CNTs in the CNT array. In the vacuum treatment process, a water-cycle vacuum pump is used to evacuate the gas. The vacuum treatment process takes about 10~60 minutes. Alternatively, the ultrasonic vibration treatment takes about 10~60 minutes. During the aforementioned processes, the gas between the CNTs in the CNT array migrates to the ends of the CNT array away from the substrate and forms gas pockets. As a function of the surface tension of the gas pockets, the ends of the CNTs away from the substrate are shifted to form honeycomb-shaped gaps. The size of the gaps is in the approximate range from 2 to 300 micrometers.

In step (e), the drying treatment is conducted in a vacuum drying oven at about 40° C.~50° C. to vaporize the solvent in the CNT array. The drying time is in the approximate range from 10 to 60 minutes.

Figure 2:
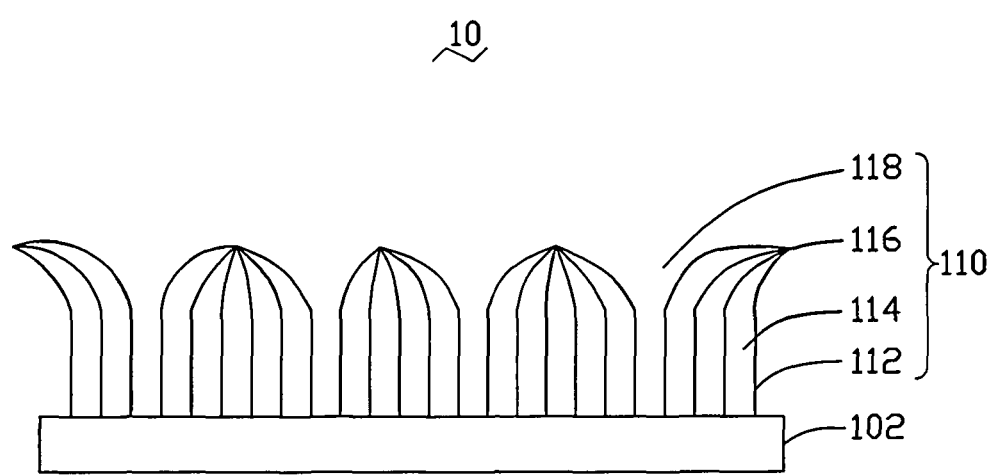
FIG. 2 is a cross-sectional schematic view of the CNT composite preform of FIG. 1.

Referring to FIG. 2, the CNT composite preform 10 prepared by the aforementioned method includes a substrate 102 and a CNT array 110 formed thereon. The CNT array 110 includes a number of CNT bundles 114. The CNT array 110 CNT bundles 114 includes first ends 112 of the CNTs being adjacent to the substrate 102 and second ends 116 of the CNTs being away from the substrate 102. Gaps 118 between the second ends 116 of the two adjacent CNT bundles 114 are bigger than the gaps between the first ends 112 thereof.

The CNTs in the CNT composite preform 10 are aligned, with unique physical properties, and are easy to handle. The CNT composite preform 10 can be applied to a variety of fields, such as electronic materials, thermal materials, optical materials, magnetic materials, catalyst materials, and so on. The CNT composite is, beneficially, combined with the metal or polymer composites, e.g., penetration of the metal or polymer material into the CNT composite perform 10. Due to the size of the gaps between the second ends 116 of the CNTs is in the approximate range from 2 microns to 300 microns, the metal or polymer material can easily penetrate the CNT array via the aforementioned gaps 118. Thus, better performing composites can be produced.

The following examples are provided by way of illustration to show how the present CNT composite preform 10 can be prepared, and should not be construed as limiting the invention in any way.

Example (1)

Figure 3:
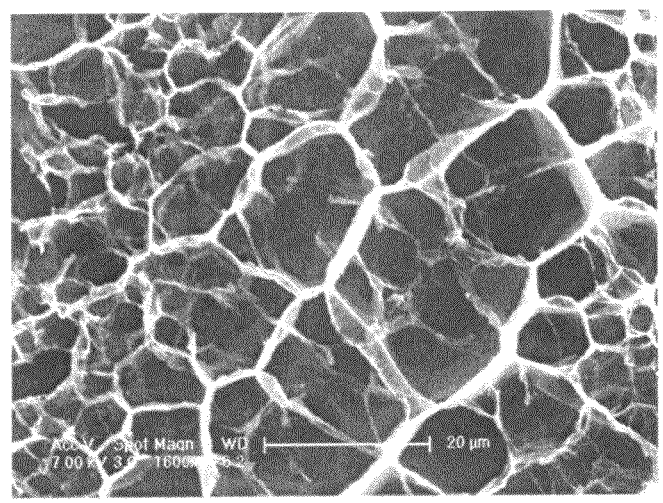
FIG. 3 shows a Scanning Electron Microscope (SEM) image of the second ends of the CNTs which are away from the substrate, after vacuum treatment process in oxydol solution, in accordance with the first embodiment.
Figure 4:
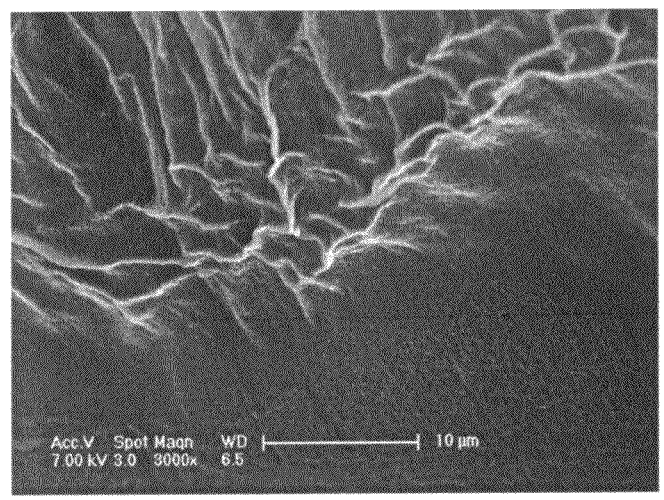
FIG. 4 shows a Scanning Electron Microscope (SEM) image of a cross-sectional surface of the CNT composite preform parallel to the CNT axis, after vacuum treatment process in oxydol solution, in accordance with the first embodiment.
Figure 5:
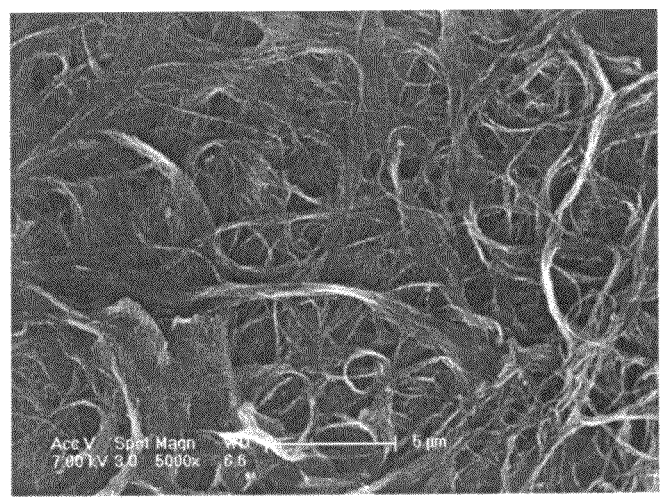
FIG. 5 shows a Scanning Electron Microscope (SEM) image of the first ends of the CNTs which are near the substrate, after vacuum treatment process in oxydol solution, in accordance with the first embodiment.

Firstly, a substrate 102 is provided 1 centimeter long and 1 centimeter wide; secondly, a CNT array 110 is formed thereon; thirdly, the CNT array 110 and the substrate 102 are placed in an oxydol solution with a mass concentration of 25% and the solution is vacuum treated for 20 minutes; fourthly, the CNT array 110 and the substrate 102 are removed from the solution; and finally, the CNT array 110 and the substrate 102 are dried in a vacuum drying oven to form a CNT composite perform 10. The Scanning Electron Microscope (SEM) image of the second ends 116 of the CNTs which are away from the substrate 102 and the cross-section of the CNT preform parallel to the CNT array 110 axis and the first ends 112 of the CNTs which are near the substrate 102 are shown in FIG. 3, FIG. 4, and FIG. 5 respectively. Gaps 118 between the second ends 116 of the two adjacent CNT bundles 114, which are bigger than the gaps between the first ends 112 of the two adjacent CNT bundles 114, can be seen in FIG. 3 to be in an approximate range from 10 to 30 microns.

Example (2)

Figure 6:
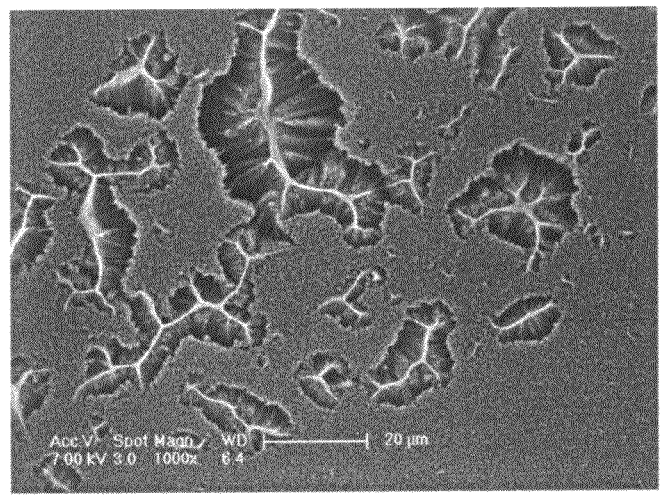
FIG. 6 shows a Scanning Electron Microscope (SEM) image of the second ends of the CNTs after vacuum treatment process in water, in accordance with a second embodiment.

Firstly, a substrate 102 is provided 1 centimeter long and 1 centimeter wide; secondly, a CNT array 110 is formed thereon; thirdly, the CNT array 110 and the substrate 102 are placed in water and the solution is vacuum treated for 40 minutes; fourthly, the CNT array 110 and the substrate 102 are removed from the solution; and finally, the CNT array 110 and the substrate 102 are dried in a vacuum drying oven to form a CNT composite perform 10. The Scanning Electron Microscope (SEM) image of the second ends 116 of the CNTs is shown in FIG. 6. The sizes of the gaps 118 between the second ends 116 of two adjacent CNT bundles 114, as can be seen in FIG. 6, are in an approximate range from 15 to 30 microns.

Example (3)

Figure 7:
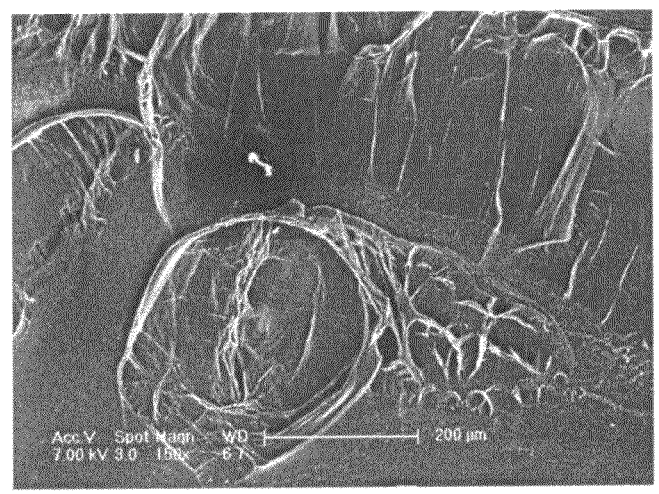
FIG. 7 shows a Scanning Electron Microscope (SEM) image of the second ends of the CNTs after vacuum treatment process in ethanol solvent, in accordance with a third embodiment.

Firstly, a substrate 102 is provided 1 centimeter long and 1 centimeter wide; secondly, a CNT array 110 is formed thereon; thirdly, the CNT array 110 and the substrate 102 are placed in an ethanol solvent and the solution is vacuum treated for 60 minutes; fourthly, the CNT array 110 and the substrate 102 are removed from the solution; and finally, the CNT array 110 and the substrate 102 are dried in a vacuum drying oven to form a CNT composite preform 10. The Scanning Electron Microscope (SEM) image of the second ends 116 of the CNTs is shown in FIG. 7. The sizes of the gaps 118 between the second ends 116 of each two adjacent CNT bundles 114, as can be seen in FIG. 7, are about 300 microns.

Example (4)

Figure 8:
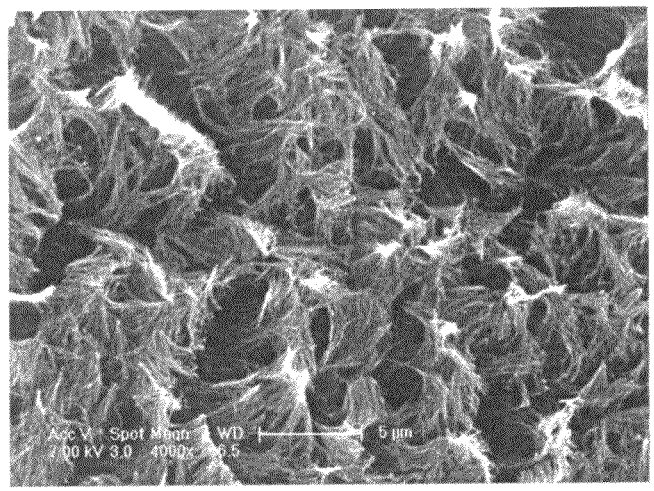
FIG. 8 shows a Scanning Electron Microscope (SEM) image of the second ends of the CNTs after ultrasonic vibration treatment process in oxydol solution, in accordance with a fourth embodiment.

Firstly, a substrate 102 is provided 1 centimeter long and 1 centimeter wide; secondly, a CNT array 110 is formed thereon; thirdly, the CNT array 110 and the substrate 102 are placed in an oxydol solution with a mass concentration of 25% and the solution is ultrasonically vibrated for 30 minutes; fourthly, the CNT array 110 and the substrate 102 are removed from the solution; and finally, the CNT array 110 and the substrate 102 are dried in a vacuum drying oven to form a CNT composite preform 10. The Scanning Electron Microscope (SEM) image of the second ends 116 of the CNTs is shown in FIG. 8. The sizes of the gaps 118 between the second ends 116 of two adjacent CNT bundles 114, as can be seen in FIG. 8, are in an approximate range from 2 to 5 microns.

Example (5)

Figure 9:
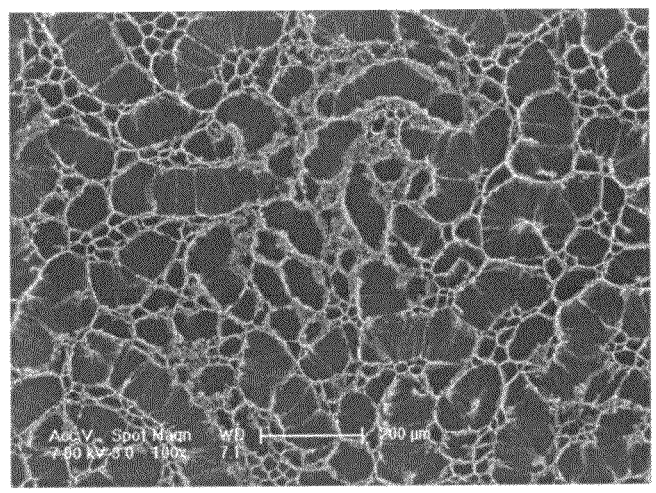
FIG. 9 shows a Scanning Electron Microscope (SEM) image of the second ends of CNTs after being removed from water, in accordance with a fifth embodiment.

Firstly, a substrate 102 is provided 1 centimeter long and 1 centimeter wide; secondly, a CNT array 110 is formed thereon; thirdly, the CNT array 110 and the substrate 102 are placed in water for 40 minutes; fourthly, the CNT array 110 and the substrate 102 are removed from the water; and finally, the CNT array 110 and the substrate 102 are dried in a vacuum drying oven to form a CNT composite preform 10. The Scanning Electron Microscope (SEM) image of the second ends 116 of the CNTs is shown in FIG. 9. The sizes of the gaps 118 between the second ends 116 of two adjacent CNT bundles 114, as can be seen in FIG. 9, are in an approximate range from 10 to 200 microns.

The CNT composite preform and the method for making the same have the following virtues: firstly, the gaps between the CNTs away from the substrate 102 are penetrable, having a size in the approximate range from 2 microns to 300 microns, thus the CNTs can easily combine with the metal or polymer to form a composite; secondly, the methods of the present embodiments have little effect on the properties of the CNT array 110, and the CNTs in the CNT array 110 are aligned; and finally, the methods are simple, easy to implement, low cost, and consume little time.

It is to be understood that the carbon nanotube array in the above-described embodiments can be any kind of a plurality of carbon nanotubes formed on the substrate and preferred orientated.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A carbon nanotube composite preform, comprising:
    a substrate;
    a carbon nanotube array formed on the substrate, wherein the carbon nanotube array comprises a plurality of carbon nanotube bundles, each of the plurality of carbon nanotube bundles comprises a first end and a second end opposite to the first end; the first end of each of the plurality of carbon nanotube bundles is attached to the substrate, and the second end of each of the plurality of carbon nanotube bundles extends away from the substrate; a first gap between adjacent two of the first ends is smaller than a second gap between adjacent two of the second ends, the plurality of carbon nanotube bundles forms one carbon nanotube layer;
    each of the plurality of carbon nanotube bundles comprises a plurality of carbon nanotubes, and each of the plurality of carbon nanotubes comprises a third end and a fourth end opposite to the third end; the third end of each of the carbon nanotubes is attached to the substrate, and the fourth end of each of the carbon nanotubes extends away from the substrate, and a third gap between adjacent two of the third ends is greater than a fourth gap between adjacent two of the fourth ends.

2. The carbon nanotube composite preform of claim 1, wherein an extending direction of each of the plurality of carbon nanotubes is gradually varied from perpendicular to the substrate to parallel with the substrate.

3. The carbon nanotube composite preform of claim 2, wherein each of the plurality of carbon nanotube bundles defines a first portion adjacent to the substrate and a second portion away from the substrate, the first portion, the plurality of carbon nanotubes are perpendicular to the substrate; and in the second portion, orientations of the plurality of carbon nanotubes is gradually varied to parallel with the substrate.

4. The carbon nanotube composite preform of claim 3, wherein in the first portion, a first distance between each adjacent two of the carbon nanotubes is the same, in the second portion, a second distance between each adjacent two of the carbon nanotubes are gradually decreased along a direction away from the substrate.

5. The carbon nanotube composite preform of claim 1, wherein a plurality of honeycomb-shaped holes is defined by the second ends of the plurality of carbon nanotube bundles around together.

6. The carbon nanotube composite preform of claim 1, wherein sizes of the first gaps between the first ends are in a range from about 1 nanometer to about 100 nanometers.

7. The carbon nanotube composite preform of claim 1, wherein diameters of the plurality of carbon nanotubes are in a range from about 1 nanometer to about 100 nanometers.

8. The carbon nanotube composite preform of claim 1, wherein lengths of the plurality of carbon nanotubes are in a range from about 1 micrometer to about 500 micrometers.

9. The carbon nanotube composite preform of claim 1, wherein sizes of the second gaps between the second ends are in a range from about 2 micrometers to about 300 micrometers.

10. The carbon nanotube composite preform of claim 1, wherein the carbon nanotube layer has a first surface and a second surface opposite to the first surface, each of the plurality of carbon nanotubes extends from the first surface to the second surface.

11. The carbon nanotube composite preform of claim 10, wherein the first surface is defined by the third ends and the second surface is defined by the fourth ends.

12. The carbon nanotube composite preform of claim 1, wherein in each of the plurality of carbon nanotube bundles, the fourth ends of the plurality of carbon nanotubes are crowded together to form a tip.

* * * * *